United States Patent
Weng et al.

(10) Patent No.: US 11,328,188 B2
(45) Date of Patent: May 10, 2022

(54) TARGET-IMAGE ACQUISITION METHOD, PHOTOGRAPHING DEVICE, AND UNMANNED AERIAL VEHICLE

(71) Applicant: SZ DJI TECHNOLOGY CO., LTD., Shenzhen (CN)

(72) Inventors: Chao Weng, Shenzhen (CN); Lei Yan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/928,874

(22) Filed: Jul. 14, 2020

(65) Prior Publication Data
US 2020/0342275 A1 Oct. 29, 2020

Related U.S. Application Data

(63) Continuation of application No. PCT/CN2018/119078, filed on Dec. 4, 2018.

(51) Int. Cl.
*H04N 5/00* (2011.01)
*G06T 5/00* (2006.01)
(Continued)

(52) U.S. Cl.
CPC .......... *G06K 9/6289* (2013.01); *B64C 39/024* (2013.01); *B64D 47/08* (2013.01);
(Continued)

(58) Field of Classification Search
CPC . G06T 2207/20208; G06T 2207/10048; G06T 2207/10024; G06T 3/0075;
(Continued)

(56) References Cited

U.S. PATENT DOCUMENTS

2014/0168444 A1* 6/2014 Bae .................. H04N 5/332
348/164
2014/0231578 A1* 8/2014 Lavoie .................. B64D 47/08
244/13
(Continued)

FOREIGN PATENT DOCUMENTS

CN 105069768 A 11/2015
CN 107292860 A 10/2017
(Continued)

OTHER PUBLICATIONS

Wei et al. "CN 107478340A Translation". Dec. 2017. (Year: 2017).*
World Intellectual Property Organization (WIPO) International Search Report for PCT/CN2018/119078 dated Aug. 29, 2019 7 pages.

*Primary Examiner* — Zhihan Zhou
(74) *Attorney, Agent, or Firm* — Anova Law Group, PLLC

(57) ABSTRACT

The present disclosure provides a target-image acquisition method. The target-image acquisition method includes acquiring a visible-light image and an infrared (IR) image of a target, captured at a same time point by a photographing device; weighting and fusing the visible-light image and the IR image to obtain a fused image; and obtaining an image of the target according to the fused image. The present disclosure also provides a photographing device and an unmanned aerial vehicle (UAV) using the method above.

20 Claims, 3 Drawing Sheets

Acquiring a visible-light image and an infrared image of a target, the visible-light image and the infrared image being captured by a photographing device at a same time point — S101

Weighting and fusing the visible-light image and the infrared image to obtain a fused image — S102

Obtaining an image of the target according to the fused image — S103

(51) Int. Cl.
*G06K 9/62* (2022.01)
*B64C 39/02* (2006.01)
*B64D 47/08* (2006.01)
*G06T 3/40* (2006.01)
*H04N 5/225* (2006.01)

(52) U.S. Cl.
CPC ............... *G06T 3/40* (2013.01); *G06T 5/009* (2013.01); *H04N 5/2253* (2013.01); *H04N 5/2258* (2013.01); *B64C 2201/127* (2013.01); *G06T 2207/10032* (2013.01); *G06T 2207/10048* (2013.01); *G06T 2207/20208* (2013.01); *G06T 2207/20221* (2013.01)

(58) Field of Classification Search
CPC . G06T 5/009; G06T 5/50; G06T 2207/20221; G06T 2207/10032; G06T 3/40; H04N 5/2258; H04N 5/2628; H04N 5/2253; B64D 47/08; G06K 9/6289; G06K 9/00771; B64C 2201/127; B64C 39/024
See application file for complete search history.

(56) References Cited

U.S. PATENT DOCUMENTS

2018/0227509 A1* 8/2018 Huang .................. H04N 9/646
2019/0318463 A1* 10/2019 Zhang ...................... G06T 5/50
2019/0378258 A1* 12/2019 Fan ........................ H04N 5/332

FOREIGN PATENT DOCUMENTS

| CN | 107478340 A | 12/2017 |
| CN | 108419062 A | 8/2018 |

* cited by examiner

TARGET-IMAGE ACQUISITION METHOD, PHOTOGRAPHING DEVICE, AND UNMANNED AERIAL VEHICLE

CROSS-REFERENCE TO RELATED APPLICATION

This application is a continuation of International Application No. PCT/CN2018/119078, filed Dec. 4, 2018, the entire content of which is incorporated herein by reference.

TECHNICAL FIELD

The present disclosure generally relates to the field of image processing technology and, more particularly, relates to a target-image acquisition method, a photographing device, and an unmanned aerial vehicle (UAV).

BACKGROUND

With the application of the image processing technology, rich target-texture information may be obtained from a visible-light image, while target-temperature information may be obtained from an infrared image. According to various related image processing techniques, in order to display both target-texture information and target-temperature information in a same image, the visible-light image and the infrared image may be fused to obtain a fused image that displays both target-texture information and target-temperature information. This method has been widely adopted in various fields, including remote sensing, target monitoring (such as power-line patrol), etc.

According to various related image processing techniques, when fusing a visible-light image with an infrared image, by superimposing the high-altitude frequency content of the visible-light image on the infrared image, or by superimposing the infrared image on the high-altitude frequency content of the visible-light image, the contrast of the visible-light image may be inserted into the infrared image that shows the temperature variation to combine the advantages of the two images. As such, the clarity and the interpretability of the superimposed image may not be lost. Specifically, a spatial filter may be adopted to extract the pixel data representing the high-altitude frequency content of the visible-light image from the visible-light image. However, this method has high requirements for pixel data, and the processing procedure is relatively complicated.

The disclosed target-image acquisition method, photographing device, and UAV are directed to solve one or more problems set forth above and other problems in the art.

SUMMARY

One aspect of the present disclosure provides a target-image acquisition method. The target-image acquisition method includes acquiring a visible-light image and an infrared (IR) image of a target, captured at a same time point by a photographing device; weighting and fusing the visible-light image and the IR image to obtain a fused image; and obtaining an image of the target according to the fused image.

Another aspect of the present disclosure provides a photographing device. The photographing device includes a visible-light image acquisition module; an IR image acquisition module; and a controller. The controller is electrically coupled with the visible-light image acquisition module and the IR image acquisition module. The visible-light image acquisition module and the IR image acquisition module are configured to respectively capture a visible-light image and an IR image of a target at a same time point. The controller is configured to acquire the visible-light image and the IR image of the target, respectively captured by the visible-light image acquisition module and the IR image acquisition module at the same time point; weight and fuse the visible-light image and the IR image to obtain a fused image; and obtain an image of the target according to the fused image.

Another aspect of the present disclosure provides an unmanned aerial vehicle (UAV). The UAV includes a frame; a photographing device, mounted on the frame and including a visible-light image acquisition module and an IR image acquisition module; and a controller, electrically coupled with the visible-light image acquisition module and the IR image acquisition module. The visible-light image acquisition module and the IR image acquisition module are configured to respectively capture a visible-light image and an IR image of a target at a same time point. The controller is configured to acquire the visible-light image and the IR image of the target, respectively captured by the visible-light image acquisition module and the IR image acquisition module at the same time point; weight and fuse the visible-light image and the IR image to obtain a fused image; and obtain an image of the target according to the fused image.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in various embodiments of the present disclosure, the drawings used in the description of the embodiments will be briefly described below. It is obvious that the drawings in the following description are some embodiments of the present disclosure, and for those of ordinary skill in the art, other drawings may also be obtained according to these drawings without creative effort.

DETAILED DESCRIPTION

In the following, the technical solutions in various embodiments of the present disclosure will be described with reference to the accompanying drawings. It is obvious that the described embodiments are only a part of various embodiments of the present disclosure, but not all the embodiments. Other embodiments obtained by those skilled in the art based on various embodiments of the present disclosure without creative efforts are within the scope of the present disclosure.

All technical and scientific terms used herein have the same meaning as commonly understood by one of ordinary skill in the art to which this disclosure belongs, unless otherwise defined. The terminology used in the description of the present disclosure is for the purpose of describing particular embodiments and is not intended to limit the disclosure. The term "and/or" used herein includes any and all combinations of one or more of the associated listed items.

Some embodiments of the present disclosure are described in detail below with reference to the accompanying drawings. The features of the embodiments and examples described below can be combined with each other without conflict.

Figure 1:
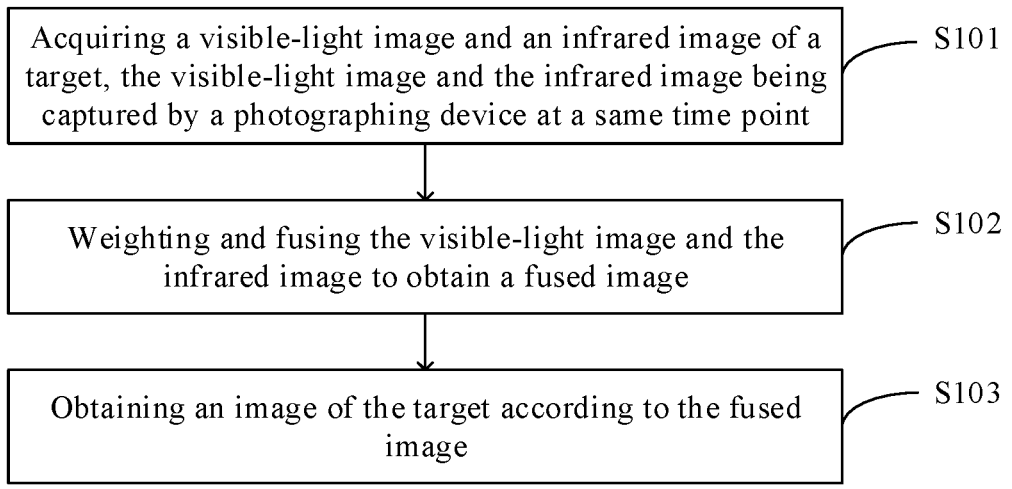
FIG. 1 illustrates a flowchart of an exemplary target-image acquisition method according to various embodiments of the present disclosure.

The present disclosure provides a target-image acquisition method. FIG. 1 a flowchart of an exemplary target-image acquisition method according to various embodiments of the present disclosure. Referring to FIG. 1, the target-image acquisition method may include the following exemplary steps.

In S101, a visible-light image and an infrared (IR) image of a target, captured at a same time point by a photographing device, may be acquired.

In one embodiment, the photographing device may include a visible-light image acquisition module and an IR image acquisition module. The visible-light image acquisition module may be configured to capture visible-light images of the target, and the IR image acquisition module may be configured to capture IR images of the target. The photographing device may be able to control the visible-light image acquisition module and the IR image acquisition module to capture images at a same time point, such that a visible-light image and an IR image of a same target may be acquired at a same time point. In the application scenario of power-line patrol, the target may be the power lines, and in the application scenario of fire detection, the target may be forest or mountain.

In the photographing device, the visible-light image acquisition module and the IR image acquisition module usually have different positions relative to the target. Relative rotation, scaling, translation, etc. may occur between the visible-light image and the IR image, and thus the visible-light image and the IR image cannot be directly fused together. According to the disclosed method, the visible-light image and the IR image may be processed prior to fusing the images together.

Figure 2:
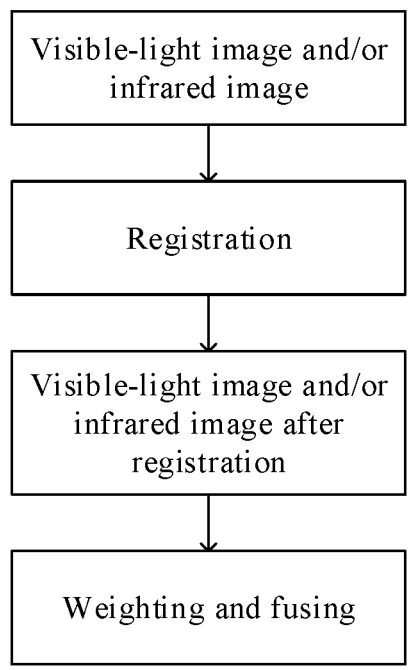
FIG. 2 illustrates a flowchart of a detailed process performed according to the target-image acquisition method shown in FIG. 1.

FIG. 2 illustrates a flowchart of a detailed process performed according to the target-image acquisition method shown in FIG. 1. Referring to FIGS. 1-2, in one embodiment, after performing S101 and prior to performing S102, the visible-light image and/or the IR image may need to be registered, such that the visible-light image and the IR image may have the same resolution and a same target may have a same position in the visible-light image and the IR image. Then, the visible-light image and the IR image may then be fused together. For example, after performing S101 (referring to FIG. 1) and prior to performing S102 (referring to FIG. 1), the visible-light image and the IR image may be adjusted according to preset calibration parameters.

The preset calibration parameters may be determined by the type of the photographing device. The preset calibration parameters may include at least one of a rotation parameter, a scaling parameter, a translation parameter, and a cropping parameter. In one embodiment, the optical axes of the visible-light image acquisition module and the IR acquisition module may be coaxially arranged, such that the visible-light image acquired by the visible-light image acquisition module and the IR image acquired by the IR image acquisition module may not appear to be relatively shifted. Therefore, translating the visible-light image and the IR image may not be necessary. In some other embodiments, the focal lengths of the visible-light image acquisition module and the IR image acquisition module may be the same, such that the size (including width and height) of the same target in the visible-light image acquired by the visible-light image acquisition module and the IR image acquired by the IR image acquisition module may be approximately the same. That is, the resolution of the visible-light image may be approximately the same as the resolution of the IR image. Therefore, scaling the visible-light image and the IR image may not be necessary.

In some applications, the preset calibration parameters may include a rotation parameter. When adjusting the visible-light image and/or the IR image according to the preset calibration parameters, the visible-light image and/or the IR image may be rotated according to the rotation parameter, such that the corresponding photographing angles of the visible-light image and the IR image may become approximately the same. In one embodiment, one of the visible-light image and the IR image may be rotated according to the rotation parameter such that the photographing angles corresponding to the visible-light image and the IR image may become approximately the same. In some other embodiments, the visible-light image and the IR image may be rotated simultaneously according to the rotation parameter such that the photographing angles corresponding to the visible-light image and the IR image may become approximately the same. It should be understood that according to various embodiments of the present disclosure, the photographing angles corresponding to the visible-light image and the IR image being approximately the same means that there is no deviation between the photographing angle of the visible-light image and the photographing angle of the IR image, or the deviation between the photographing angle of the visible-light image and the photographing angle of the IR image is within an allowable deviation range.

In some applications, the preset calibration parameters may include a scaling parameter. When adjusting the visible-light image and/or the IR image according to the preset calibration parameters, the visible-light image and/or the IR image may be scaled according to the scaling parameter, such that the sizes of the same target in the visible-light image and the IR image (that is, the resolutions of the visible-light image and the IR image) may be approximately the same. In one embodiment, one of the visible-light image and the IR image may be scaled according to the scaling parameter such that the resolutions of the visible-light image and the IR image may become approximately the same. In some other embodiments, the visible-light image and the IR image may be scaled simultaneously according to the scaling parameter such that the resolutions of the visible-light image and the IR image may become approximately the same. It should be understood that according to various embodiments of the present disclosure, the resolutions of the visible-light image and the IR image being approximately the same means that there is no deviation between the resolution of the visible-light image and the resolution of the IR image, or the deviation between the resolution of the visible-light image and the resolution of the IR image is within an allowable deviation range.

In some applications, the preset calibration parameters may include a translation parameter. When adjusting the visible-light image and/or the IR image according to the preset calibration parameters, the visible-light image and/or the IR image may be translated according to the translation parameter, such that the positions of a same target in the visible-light image and the IR image may approximately overlap with each other. In one embodiment, one of the visible-light image and the IR image may be translated according to the translation parameter such that the positions of a same target in the visible-light image and the IR image may become approximately overlapping with each other. In some other embodiments, the visible-light image and the IR image may be translated simultaneously according to the translation parameter such that the positions of a same target in the visible-light image and the IR image may become approximately overlapping with each other. It should be understood that according to various embodiments of the present disclosure, the positions of a same target in the visible-light image and the IR image approximately overlapping with each other means that the position of a target in the visible-light image overlaps with the position of the same target in the IR image, or the positions of a same target in the visible-light image and the IR image approximately overlapping with each other means that the deviation between the position of a target in the visible-light image and the position of the same target in the IR image is within an allowable deviation range.

In some applications, the preset calibration parameters may include a cropping parameter. When adjusting the visible-light image and/or the IR image according to the preset calibration parameters, the visible-light image and/or the IR image may be cropped according to the cropping parameter, such that the visible-light image and the IR image may retain approximately a same target region. In one embodiment, one of the visible-light image and the IR image may be cropped according to the cropping parameter such that the visible-light image and the IR image may retain approximately the same target region. In some other embodiments, the visible-light image and the IR image may be cropped simultaneously according to the cropping parameter such that the visible-light image and the IR image may maintain approximately a same target region.

It should be understood that according to various embodiments of the present disclosure, the visible-light image and the IR image approximately retaining a same target region means that the target region of the visible-light image is exactly the same as the target region of the IR image, or the deviation between the target region of the visible-light image and the target region of the IR image is within an allowable deviation range.

In S102, the visible-light image and the IR image may be weighted and fused to obtain a fused image.

In one embodiment, when weighting and fusing the visible-light image and the IR image, the pixel value of each pixel in the visible-light image and the pixel value of the corresponding pixel in the IR image may be fused according to the first coefficient and the second coefficient, respectively. For example, the first coefficient may be used to represent the fusion weight of each pixel in the visible-light image, and the second coefficient may be used to represent the fusion weight of each pixel in the IR image. The fused image obtained by fusion may contain both the visible-light information (e.g., texture information) of the target and the temperature of the target. Compared with the individual image of the visible-light image or the IR image, the fused image may contain more information, and thus meet the needs of specific fields.

For example, in the application scenario of power-line patrol, the target may be the power lines. A visible-light image of the power lines may make it easier to identify the external appearance of the power lines, which may help determine external damages of the power lines. As such, specific locations of the damages may be identified. However, when the external appearance of the power lines is intact while damages occur internally in the power lines, the locations of the damages may not be identified from the visible-light image of the power lines; while from the IR image of the power lines, the temperature inside the power lines may be easily identified, which may be further used to determine whether a damage occurs in the power lines. For example, when the power lines are in operation, the damaged power line may heat up abnormally, e.g., the temperature may be higher than the temperature of a normally operating power line, or the damaged power line may not heat up at all, and thus the temperature may be lower than the temperature of a normally operating power line. However, because of the poor interpretability of the IR image, determining the exact location of the damaged power line according to the IR image of the power lines may be difficult and time-consuming. According to various embodiments of the present disclosure, the fused image contains not only the visible-light information of the power lines but also the temperature information of the power lines. Therefore, it may be easier to not only determine externally-damaged and internally-damaged power lines, but also identify the exact location of the damaged power lines.

In one embodiment, the pixel value of each pixel in the fused image may be a sum of the product of the first coefficient and the pixel value of the corresponding pixel in the visible-light image and the product of the second coefficient and the pixel value of the corresponding pixel in the IR image. For example, the pixel value of an $i^{th}$ pixel in the fused image $Pf_i$ may be given by:

$$Pf_i = C_1 \times Pv_i + C_2 \times Pi_i$$

where $Pv_i$ is the pixel value of the $i^{th}$ pixel in the visible-light image (that is, the pixel in the visible-light image that corresponds to the $i^{th}$ pixel in the fused image $Pf_i$), $Pi_i$ is the pixel value of the $i^{th}$ pixel in the IR image (that is, the pixel in the IR image that corresponds to the $i^{th}$ pixel in the fused image $Pf_i$), $C_1$ is the first coefficient, and $C_2$ is the second coefficient. Through the simple weighting and fusing process described above, the visible-light image and the IR image may be fused together. The fusion process does not require complicated steps, such as target detection and image processing.

The first coefficient and the second coefficient may be set according to the fusion requirements. For example, in some embodiments, the sum of the first coefficient of each pixel in the visible-light image and the second coefficient of the corresponding pixel in the IR image may be 1. The setting method may be able to reduce the loss of the pixels, and may also ensure that the information of each pixel in the fused image is not lost or weakened.

In some other embodiments, for a portion of the pixels in the visible-light image, the sum of the first coefficient of each pixel and the second coefficient of the corresponding pixel in the IR image may be 1, and for the other portion of the pixels in the visible-light image, the sum of the first coefficient of each pixel and the second coefficient of the corresponding pixel in the IR image may not be 1. For example, because the fusion result is focused on the target region in the visible-light image and the target region in the IR image, the non-target region in the visible-light image and the non-target region in the IR image may be weakened in the fusion process. In the application scenario of power-line patrol, more attention may be paid to the visible-light information of photographed objects with a higher temperature, and less attention may be paid to the visible-light information of photographed objects with a lower temperature. Therefore, the first coefficient of a pixel corresponding to a photographed object with a lower temperature in the visible-light image and the second coefficient of the corresponding pixel of the photographed object in the IR image may be set smaller, and thus the sum of the two coefficients may be less than 1.

Further, in one embodiment, both the first coefficient and the second coefficient may preset coefficients. For example, the first coefficient of each pixel in the visible-light image may be 0.5, and the second coefficient of the corresponding pixel in the IR image may also be 0.5. As such, the weight of the visible-light information and the weight of the IR information retained in the fused image may be equal to each other. It should be understood that the first coefficient of each pixel in the visible-light image and the second coefficient of the corresponding pixel in the IR image may be set to other values. In one example, the first coefficient of each pixel in the visible-light image may be 0.6, while the second coefficient of the corresponding pixel in the IR image may be 0.4. In another example, the first coefficient of each pixel in the visible-light image may be 0.4, while the second coefficient of the corresponding pixel in the IR image may be 0.6.

In other embodiments, prior to fusing the pixel value of each pixel in the visible-light image and the pixel value of the corresponding pixel in the IR image according to the first coefficient and the second coefficient, the first coefficient and the second coefficient may need to be determined according to the visible-light image and the IR image. For example, the first coefficient of each pixel in the visible-light image and the second coefficient of the corresponding pixel in the IR image may be set according to the target region and the non-target region (such as the background region) in the visible-light image and the IR image.

When setting the first coefficient of each pixel in the visible-light image and the second coefficient of the corresponding pixel in the IR image according to the target region and the non-target region in the visible-light image and the IR image, a first position region corresponding to the target and a second position region corresponding to the target may be determined from the visible-light image and the IR image, respectively. Then, the value of the second coefficient of each pixel in the second position region of the IR image may be set to be larger than the value of the first coefficient of the corresponding pixel in the first position region of the visible-light image, so that the target region in the fused image may more reflect the temperature information of the target. Alternatively, the first coefficient of each pixel in the first position region may be set to be larger than the second coefficient of the second coefficient of the corresponding pixel in the second position, so that the target region in the fused image may more reflect the visible-light information of the target.

In one embodiment, determining the first position region from the visible-light image and determining the second position region from the IR image may be implemented by existing algorithms. For example, the target in the visible-light image and the target in the IR image may be framed or clicked manually, and then the first target region of the target in the visible-light image and the second target region of the target in the IR image may be determined by existing target detection algorithm. In the application scenario of power-line patrol, in order to know the situation inside the power line, the value of the second coefficient of each pixel in the second position region may be set to be larger than the value of the first coefficient of the corresponding pixel in the first position region, so that the fused image may more reflect the temperature information inside the power line, which may facilitate determining whether the inside of the powerline is damaged.

Further, in some embodiments, the value of the first coefficient of each pixel in the region of the visible-light image other than the first position region (that is, in the non-target region) may be set to equal the value of the second coefficient of the corresponding pixel in the IR image to reduce the difficulty of fusion. Alternatively, the value of the first coefficient of each pixel in the region of the visible-light image other than the first position region may be set different from the value of the second coefficient of the corresponding pixel in the IR image. Moreover, when the information of the non-target region in the fused image needs to be weakened, the value of the first coefficient of each pixel in the region of the visible-light image other than the first position region may be set to be smaller than the value of the first coefficient of each pixel in the first position region of the visible-light image, and the value of the second coefficient of each pixel in the region of the IR image other than the second position region may be set to be smaller than the value of the second coefficient of each pixel in the second position region of the IR image.

Further, in some embodiments, the first coefficients of the pixels in the visible-light image may be equal to each other. In addition, the second coefficients of the pixels in the IR image may also be equal to each other. Setting the first coefficients of the pixels in the visible-light image to be the same and the second coefficient of the pixels in the IR image to be the same may be able to reduce the complexity of the weighting and fusing process. When more visible-light information of the target needs to be obtained, the value of the first coefficient of each pixel in the visible-light image may be set to be larger than the value of the second coefficient of each pixel in the IR image. For example, the first coefficient of each pixel in the visible-light image may be 0.7 and the second coefficient of each pixel in the IR image may be 0.3; or, the first coefficient of each pixel in the visible-light image may be 0.8 and the second coefficient of each pixel in the IR image may be 0.2, etc. When more temperature information of the target needs to be obtained, the value of the first coefficient of each pixel in the visible-light image may be set to be smaller than the value of the second coefficient of each pixel in the IR image. For example, the first coefficient of each pixel in the visible-light image may be 0.4 and the second coefficient of each pixel in the IR image may be 0.6; or, the first coefficient of each pixel in the visible-light image may be 0.3 and the second coefficient of each pixel in the IR image may be 0.7, etc. Alternatively, the first coefficient of each pixel in the visible-light image and the second coefficient of the corresponding pixel in the IR image may have a same value. In one embodiment, the first coefficient of each pixel in the visible-light image may be 0.5, and the second coefficient of each pixel in the IR image may also be 0.5.

In some embodiments, the values of the first coefficients of the pixels in the visible-light image may not be all the same. That is, the first coefficients of the pixels in the visible-light image may have at least two different values. For example, the first coefficient of the pixels in the target region of the visible-light image may be set to be larger than the first coefficient of the pixels in the non-target region of the visible-light image, such that the visible-light information of the non-target region may be weakened. Further, in order to reduce the difficulty of the weighting and fusing process, the first coefficients of the pixels in the target region of the visible-light image may be set to have a same value, and the first coefficients of the pixels in the non-target region of the visible-light image may be set to have a same value. It should be understood that in other embodiments, the first coefficients of the pixels in the target region of the visible-light image may be set to have different values, and/or the first coefficients of the pixels in the non-target region of the visible-light image may be set to have different values.

Further, the values of the second coefficients of the pixels in the IR image may not be all the same. That is, the second coefficients of the pixels in the IR image may have at least two different values. For example, the second coefficient of the pixels in the target region of the IR image may be set to be larger than the second coefficient of the pixels in the non-target region of the IR image, such that the temperature information of the non-target region may be weakened. Further, in order to reduce the difficulty of the weighting and fusing process, the second coefficients of the pixels in the target region of the IR image may be set to have a same value, and the second coefficients of the pixels in the non-target region of the IR image may be set to have a same value. It should be understood that in other embodiments, the second coefficients of the pixels in the target region of the IR image may be set to have different values, and/or the second coefficients of the pixels in the non-target region of the IR image may be set to have different values.

In S103, an image of the target may be obtained according to the fused image.

In one embodiment, after obtaining the fused image according to S102, the fused image may not need to be further processed. The fused image obtained according to S102 may be directly used as the image of the target.

Figure 3:
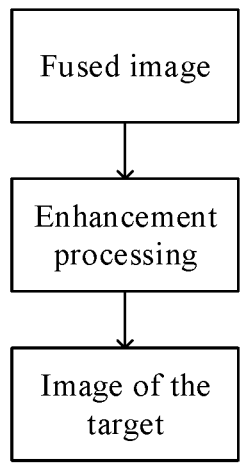
FIG. 3 illustrates a flowchart of another detailed process performed according to the target-image acquisition method shown in FIG. 1.

In other embodiments, the fused image obtained according to S102 may need to be processed to enhance the details of the fused image and improve the display effect of the fused image. FIG. 3 illustrates a flowchart of a detailed process performed according to the target-image acquisition method shown in FIG. 1. Referring to FIG. 3, when obtaining the image of the target according to the fused image, an enhancement process may need to be performed on the fused image, and then the image obtained after performing the enhancement process may be used as the image of the target.

The method used for enhancing the fused image may be selected according to actual needs. For example, the method for enhancing the fused image may include increasing the contrast of the fused image, reducing the noise of fused image, etc. In one embodiment, the fused image may be enhanced by increasing the contrast of the fused image. For example, when increasing the contrast of the fused image, the pixel value of each pixel of the fused image may be adjusted according to a preset contrast-adjustment model. The preset contrast-adjustment model may be used to represent the relationship between the pixel value of each pixel in the fused image and the pixel value of the corresponding pixel in the image of the target. In one embodiment, the preset contrast-adjustment model may be $$g(i,j)=m \times f(i,j)+n$$

where (i,j) represents the coordinates of each pixel I the fused image, f (i,j) is the pixel value of each pixel in the fused image before the contrast is improved, g (i,j) is the pixel value of each pixel in the fused image after the contrast is improved (e.g., the pixel value of the corresponding pixel in the obtained image of the target), m and n are both adjustment parameters. The values of m and n may be determined according to actual needs.

According to various embodiments of the present disclosure, the target-image acquisition method performs a weighting and fusing process on the visible-light image and the IR image of a target, such that the obtained image of the target retains not only the visible-light details but also the temperature information of the target. The weighting and fusing process may not require complex image processing of the visible-light image and/or the IR image. Therefore, the disclosed method demonstrates various advantages, such as simple scheme, high fusion quality, etc.

Figure 4:
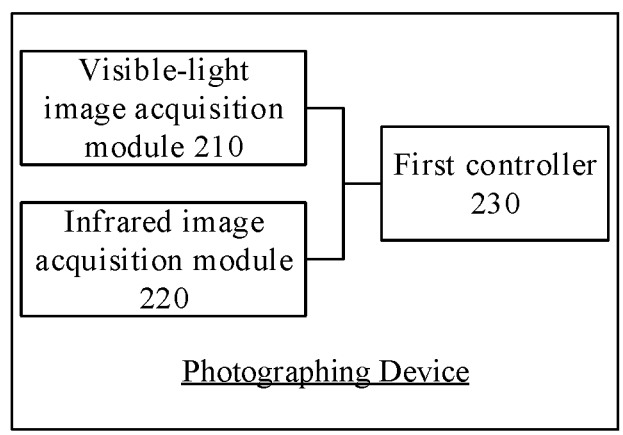
FIG. 4 illustrates a structural block diagram of an exemplary photographing device according to various embodiments of the present disclosure.

The present disclosure also provides a photographing device. FIG. 4 illustrates a structural block diagram of an exemplary photographing device according to various embodiments of the present disclosure. Referring to FIG. 4, the photographing device 200 may include a visible-light image acquisition module 210, an IR image acquisition module 220, and a first controller 230. The first controller 230 may be electrically coupled with the visible-light image acquisition module 210 and the IR image acquisition module 220.

In one embodiment, the visible-light image acquisition module 210 and the IR image acquisition module 220 may be configured to respectively capture a visible-light image and an IR image of a target at the same time point. The first controller 230 may be configured to receive the visible-light image and the IR image of the target that are respectively captured by the visible-light image acquisition module 210 and the IR image acquisition module 220 at the same time point, weight and fuse the visible-light image and the IR image to obtain a fused image, and then obtain an image of the target according to the fused image.

In one embodiment, the first controller 230 may operate according the target-image acquisition method shown in FIGS. 1-3. For the details of the operation, reference may be made to the description of the target-image acquisition method in various embodiments provided above, and the details are not described herein again.

In one embodiment, the first controller 230 may be a central processing unit (CPU). The first controller 230 may further include a hardware chip. The hardware chip may be an application-specific integrated circuit (ASIC), a programmable logic device (PLD), or a combination of the two. The PLD may be a complex programmable logic device (CPLD), a field-programmable gate array (FPGA), a generic array logic (GAL), or any appropriate combination of the above.

Figure 5:
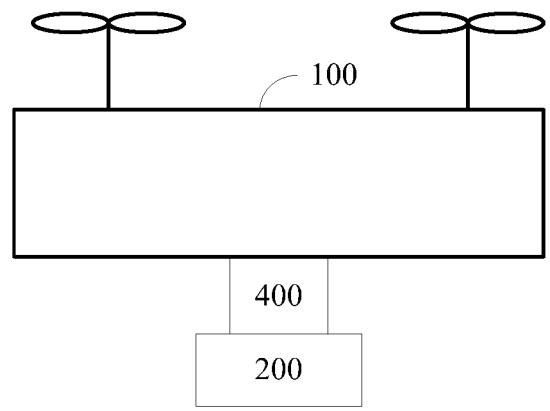
FIG. 5 illustrates a schematic structural diagram of an exemplary UAV according to various embodiments of the present disclosure.

The present disclosure further includes an unmanned aerial vehicle (UAV). FIG. 5 illustrates a schematic structural diagram of an exemplary UAV according to various embodiments of the present disclosure, and FIG. 6 illustrates a structural block diagram of the UAV shown in FIG. 5.

Figure 6:
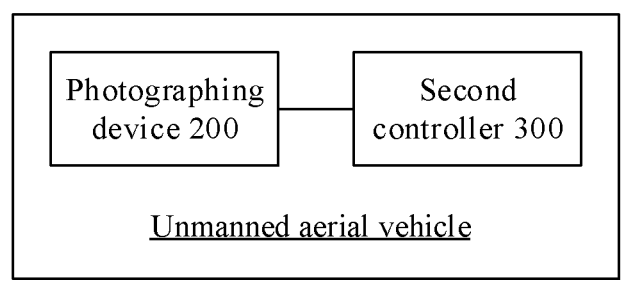
FIG. 6 illustrates a structural block diagram of the UAV shown in FIG. 5.

Referring to FIGS. 5-6, the UAV may include a frame 100, a photographing device 200, and a second controller 300. The photographing device 200 and the second controller 300 may be mounted on the frame 100. The photographing device 200 may include a visible-light image acquisition module and an IR image acquisition module. The second controller 300 may be electrically coupled with the visible-light image acquisition module and the IR image acquisition module.

In one embodiment, the visible-light image acquisition module and the IR image acquisition module may be configured to respectively capture a visible-light image and an IR image of a target at the same time point. The second controller 300 may be configured to receive the visible-light image and the IR image of the target that are respectively captured by the visible-light image acquisition module and the IR image acquisition module at the same time point, weight and fuse the visible-light image and the IR image to obtain a fused image, and then obtain an image of the target according to the fused image.

In one embodiment, the second controller 300 may operate according the target-image acquisition method shown in FIGS. 1-3. For the details of the operation, reference may be made to the description of the target-image acquisition method in various embodiments provided above, and the details are not described herein again.

The second controller 300 may be a flight controller, a first controller 230 of the photographing device 200 consistent with various embodiments provided above, or a combination of the flight controller and the first controller 230. That is, in some embodiments, the second controller 300 may also be configured to control the flight of the UAV.

In one embodiment, the second controller 300 may be a CPU. The second controller 300 may further include a hardware chip. The hardware chip may be an ASIC, a PLD, or a combination of the two. The PLD may be a CPLD, a FPGA, a GAL, or any appropriate combination of the above.

The frame 100 may include a fuselage (not shown) and at least two tippods (not shown) attached to both sides of the bottom of the fuselage. Further, the frame 100 may also include arms attached to both sides of the fuselage. In one embodiment, the photographing device 200 may be mounted on the fuselage. In order to improve the stability of the photographing device 200, referring to FIG. 5, the photographing device 200 may be mounted on the fuselage through a gimbal 400. The gimbal 400 may be a dual-axial gimbal or a triple-axial gimbal. In one embodiment, the UAV may be a fixed-wing UAV, or a multi-rotor UAV.

In one embodiment, the visible-light image acquisition module may be a visible-light image sensor and the IR image acquisition module may be an IR image sensor. In addition, the photographing device 200 may also include a housing, and the visible-light image sensor and the IR image sensor may be disposed on the housing.

In other embodiments, the visible-light image acquisition module may be an independent visible-light camera, and the IR image acquisition module may be an IR thermal imager. The visible-light camera and the IR thermal imager may be installed through a mounting frame.

It should be noted that the functional modules in various embodiments of the present disclosure may be integrated into one processing unit, or each of the modules may exist separately physically, or two or more modules may be integrated into one unit. The integrated unit described above may be implemented in the form of hardware, or in the form of hardware combined with software functional units.

The above integrated unit implemented in the form of software functional units may be stored in a computer-readable storage medium. The software functional units stored in a storage medium may include a plurality of instructions for making a computer device (which may be a personal computer, a server, or a network device) or an intelligent terminal device or a processor execute part of the steps of the method according to various embodiments of the present invention. The storage media described above may include: a U disk, a mobile hard disk, a read-only memory (ROM), a random access memory (RAM), a magnetic disk, a compact discs, and/or other media that can store program code.

In the various embodiments provided by the present application, it should be understood that the disclosed systems, devices, and methods may be implemented in other manners. For example, the device embodiments described above are merely illustrative. For instance, in various embodiments of the present disclosure, the units are divided or defined merely according to the logical functions of the units, and in actual applications, the units may be divided or defined in another manner. For example, multiple units or components may be combined or integrated into another system, or some features can be ignored or not executed. In addition, the mutual coupling or direct coupling or communication connection shown or discussed may be an indirect coupling or communication connection through some interface, device or unit, and may be in an electrical, mechanical, or other form.

The units described as separate components may or may not be physically separated, and the components displayed as a unit may or may not be physical in a unit, that is, they may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

Finally, it should be noted that the above embodiments are merely illustrative of, but not intended to limit, the technical solutions of the present disclosure; although the present disclosure has been described in detail with reference to the above embodiments, those skilled in the art should understand that the technical solutions described in the above embodiments may be modified, or part or all of the technical features may be equivalently replaced; and the modifications or substitutions do not depart from the scope of the technical solutions of various embodiments of the present disclosure.

What is claimed is:

1. A target-image acquisition method, comprising:
acquiring a visible-light image and an infrared (IR) image of a target, captured at a same time point by a photographing device;
determining a first position region of the visible-light image including the target;
determining a second position region of the IR image including the target;
weighting and fusing the visible-light image and the IR image to obtain a fused image using a first coefficient for each pixel of the visible-light image and a second coefficient for each pixel of the IR image, wherein:
a value of the first coefficient of each pixel in a region of the visible-light image other than the first position region is set to be smaller than a value of the first coefficient of each pixel in the first position region;
a value of the second coefficient of each pixel in a region of the IR image other than the second position region is set to be smaller than a value of the second coefficient of each pixel in the second position region;
in a first portion of the visible-light image and a corresponding first portion of the IR image, a sum of the first coefficient and the second coefficient is equal to 1; and in a second portion of the visible-light image and a corresponding second portion of the IR image, the sum of the first coefficient and the second coefficient is less than 1; and obtaining an image of the target according to the fused image.

2. The method according to claim 1, wherein the weighting and fusing the visible-light image and the IR image includes:
fusing a pixel value of each pixel in the visible-light image and a pixel value of a corresponding pixel in the IR image according to the first coefficient and the second coefficient, wherein:
the first coefficient represents a fusing weight of the pixel in the visible-light image, and the second coefficient represents a fusing weight of the pixel in the IR image.

3. The method according to claim 2, wherein:
a pixel value of each pixel in the fused image is equal to a sum of a product of the first coefficient and a pixel value of a corresponding pixel in the visible-light image and a product of the second coefficient and a pixel value of a corresponding pixel in the IR image.

4. The method according to claim 2, wherein:
first coefficients of pixels in the visible-light image have a same value.

5. The method according to claim 4, wherein:
the first coefficient of each pixel in the visible-light image and the second coefficient of the corresponding pixel in the IR image have a same value.

6. The method according to claim 2, prior to fusing the pixel value of each pixel in the visible-light image and the pixel value of the corresponding pixel in the IR image according to the first coefficient and the second coefficient, further including:
determining, according to the visible-light image and the IR image, the first coefficient and the second coefficient.

7. The method according to claim 6, wherein the determining, according to the visible-light image and the IR image, the first coefficient and the second coefficient includes:
setting the second coefficient of each pixel in the second position region to be larger than the first coefficient of a corresponding pixel in the first position region.

8. The method according to claim 7, wherein:
the first coefficient of each pixel in the region, other than the first position region, in the visible-light image and the second coefficient of a corresponding pixel in the region, other than the second position region, in the IR image have a same value.

9. The method according to claim 1, wherein the obtaining the image of the target according to the fused image includes:
performing an enhancement process on the fused image to obtain an enhanced image; and
using the enhanced image as the image of the target.

10. The method according to claim 9, wherein the performing the enhancement process on the fused image includes:
increasing a contrast of the fused image.

11. The method according to claim 10, wherein the increasing the contrast of the fused image includes:
adjusting a pixel value of each pixel in the fused image according to a preset contrast-adjustment model, wherein:
the preset contrast-adjustment model represents a relationship between the pixel value of each pixel in the fused image and a pixel value of a corresponding pixel in the image of the target.

12. The method according to claim 1, after acquiring the visible-light image and the IR image of the target, captured at a same time point by the photographing device, and prior to weighting and fusing the visible-light image and the IR image to obtain the fused image, further including:
adjusting the visible-light image and/or the IR image according to preset calibration parameters.

13. The method according to claim 12, wherein:
the preset calibration parameters include a rotation parameter; and
the adjusting the visible-light image and/or the IR image according to the preset calibration parameters includes:
rotating the visible-light image and/or the IR image according to the rotation parameter to make a photographing angle corresponding to the visible-light image and a photographing angle corresponding to the IR image approximately same.

14. The method according to claim 12, wherein:
the preset calibration parameters include a scaling parameter; and
the adjusting the visible-light image and/or the IR image according to the preset calibration parameters includes:
scaling the visible-light image and/or the IR image according to the scaling parameter to make a size of a target in the visible-light image and a size of a same target in the IR image approximately same.

15. The method according to claim 12, wherein:
the preset calibration parameters include a translation parameter; and
the adjusting the visible-light image and/or the IR image according to the preset calibration parameters includes:
translating the visible-light image and/or the IR image according to the translation parameter to make a position of a target in the visible-light image and a position of a same target in the IR image approximately overlap with each other.

16. The method according to claim 12, wherein:
the preset calibration parameters include a cropping parameter; and
the adjusting the visible-light image and/or the IR image according to the preset calibration parameters includes:
cropping the visible-light image and/or the IR image according to the cropping parameter to make the visible-light image and the IR image maintain approximately a same target region.

17. The method according to claim 6, wherein determining the first coefficient and the second coefficient includes setting the first coefficient for a pixel corresponding to an object in the visible-light image and the second coefficient for a corresponding pixel corresponding to the object in the IR image according to a temperature of the object.

18. The method according to claim 6, wherein determining the first coefficient and the second coefficient includes, in response to a temperature of a first photographed object being lower than a temperature of a second photographed object:
setting the first coefficient for a first pixel of the first photographed object in the visible-light image to be smaller than the first coefficient for a second pixel of the second photographed object in the visible-light image; and
setting the second coefficient for a corresponding first pixel of the first photographed object in the IR image to be smaller than the second coefficient for a corresponding second pixel of the second photographed object in the IR image.

19. A photographing device, comprising:
a visible-light image acquisition module;
an IR image acquisition module; and
a controller, wherein:
  the controller is electrically coupled with the visible-light image acquisition module and the IR image acquisition module, respectively,
  the visible-light image acquisition module and the IR image acquisition module are configured to respectively capture a visible-light image and an IR image of a target at a same time point, and
  the controller is configured to:
    acquire the visible-light image and the IR image of the target, respectively captured by the visible-light image acquisition module and the IR image acquisition module at the same time point;
    determine a first position region of the visible-light image including the target;
    determine a second position region of the IR image including the target;
    weight and fuse the visible-light image and the IR image to obtain a fused image using a first coefficient for each pixel of the visible-light image and a second coefficient for each pixel of the IR image, wherein:
      a value of the first coefficient of each pixel in a region of the visible-light image other than the first position region is set to be smaller than a value of the first coefficient of each pixel in the first position region;
      a value of the second coefficient of each pixel in a region of the IR image other than the second position region is set to be smaller than a value of the second coefficient of each pixel in the second position region;
      in a first portion of the visible-light image and a corresponding first portion of the IR image, a sum of the first coefficient and the second coefficient is equal to 1; and
      in a second portion of the visible-light image and a corresponding second portion of the IR image, the sum of the first coefficient and the second coefficient is less than 1; and
    obtain an image of the target according to the fused image.

20. An unmanned aerial vehicle (UAV), comprising:
a frame;
a photographing device, mounted on the frame and including a visible-light image acquisition module and an IR image acquisition module; and
a controller, electrically coupled with the visible-light image acquisition module and the IR image acquisition module, wherein:
  the visible-light image acquisition module and the IR image acquisition module are configured to respectively capture a visible-light image and an IR image of a target at a same time point, and
  the controller is configured to:
    acquire the visible-light image and the IR image of the target, respectively captured by the visible-light image acquisition module and the IR image acquisition module at the same time point;
    determine a first position region of the visible-light image including the target;
    determine a second position region of the IR image including the target;
    weight and fuse the visible-light image and the IR image to obtain a fused image using a first coefficient for each pixel of the visible-light image and a second coefficient for each pixel of the IR image, wherein:
      a value of the first coefficient of each pixel in a region of the visible-light image other than the first position region is set to be smaller than a value of the first coefficient of each pixel in the first position region;
      a value of the second coefficient of each pixel in a region of the IR image other than the second position region is set to be smaller than a value of the second coefficient of each pixel in the second position region;
      in a first portion of the visible-light image and a corresponding first portion of the IR image, a sum of the first coefficient and the second coefficient is equal to 1; and
      in a second portion of the visible-light image and a corresponding second portion of the IR image, the sum of the first coefficient and the second coefficient is less than 1; and
    obtain an image of the target according to the fused image.

* * * * *